US007363920B2

(12) United States Patent
Ueno

(10) Patent No.: US 7,363,920 B2
(45) Date of Patent: Apr. 29, 2008

(54) FUEL SUPPLY CONTROL SYSTEM FOR INTERNAL COMBUSTION ENGINE

(75) Inventor: Masaki Ueno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/606,988

(22) Filed: Dec. 1, 2006

(65) Prior Publication Data

US 2007/0074710 A1 Apr. 5, 2007

(30) Foreign Application Priority Data

Dec. 5, 2005 (JP) ............................ 2005-350316

(51) Int. Cl.
*F02D 41/38* (2006.01)
*F02M 51/00* (2006.01)
*G06F 17/00* (2006.01)

(52) U.S. Cl. ....................... 123/679; 123/478; 701/104

(58) Field of Classification Search ................ 123/679, 123/478, 480, 486; 701/103–105
See application file for complete search history.

(56) References Cited

U.S. PATENT DOCUMENTS 4,825,834 A * 5/1989 Toshimitsu et al. ......... 123/478
4,883,039 A * 11/1989 Toshimitsu et al. ......... 123/478
4,947,816 A * 8/1990 Nakaniwa et al. .......... 123/478
5,282,449 A 2/1994 Takahashi et al.

FOREIGN PATENT DOCUMENTS

EP 0 152 019 8/1985
JP 60-166731 8/1985
JP 2000-110647 4/2000
JP 2000-110647 A 4/2000

OTHER PUBLICATIONS

J.B. Heywood et al.; "Modeling Real Engine Flow and Combustion Processes"; Internal Combustion Engine Fundamentals; 1988; pp. 748-765.

* cited by examiner

*Primary Examiner*—Hieu T. Vo
(74) *Attorney, Agent, or Firm*—Arent Fox, LLP.

(57) ABSTRACT

A fuel supply control system for an internal combustion engine having at least one fuel injection valve for injecting fuel into an intake pipe or a combustion chamber of the engine. A flow rate of air supplied to the engine and an air-fuel ratio are detected. A demand fuel injection amount is set according to an operating condition of the engine. An injection amount command value of fuel injected by at least one fuel injection valve according to the demand fuel injection amount. An amount of fuel burned in the engine is calculated according to the detected intake air flow rate and air-fuel ratio. At least two correlation parameters, which indicate a relationship between the estimated burned fuel amount and the injection amount command value, are identified. The injection amount command value is then corrected according to the at least two identified correlation parameters.

6 Claims, 4 Drawing Sheets

FUEL SUPPLY CONTROL SYSTEM FOR INTERNAL COMBUSTION ENGINE

BACKGROUND OF THE INVENTION

1. Field of the Invention

The present invention relates to a fuel supply control system for an internal combustion engine, and particularly relates to a system which corrects an operating characteristic of a fuel injection device that injects fuel into an intake pipe or a combustion chamber of the internal combustion engine.

2. Description of the Related Art

A fuel injection device generally includes an electromagnetic valve which opens for a time period based on a valve opening command signal supplied from a control device so as to inject fuel into an intake pipe or combustion chamber of an internal combustion engine. A relationship between the valve opening command signal and an amount of actually injected fuel changes depending on differences in the operating characteristic resulting from the manufacturing process or aging of the components. Accordingly, the amount of actually injected fuel occasionally shifts away from a target amount of fuel to be injected.

Japanese Patent Laid-open No. 2000-110647 (JP '647) discloses a method for calculating a deviation amount between the amount of fuel actually injected by the fuel injection device and the target fuel injection amount which is set according to the engine operating condition. The deviation amount is calculated based on an oxygen concentration detected by an oxygen concentration sensor disposed in the exhaust system of the engine and an intake air flow rate detected by an intake air flow rate sensor.

According to the method disclosed in JP '647, the deviation amount of the fuel injection amount is calculated as a simple scalar value. Accordingly, the deviation amount changes as the engine operating condition changes. Therefore, the method disclosed in JP '647 requires calculating a plurality of deviation amounts according to a corresponding plurality of engine operating regions.

Further, since the calculation of the above-described deviation amount is performed during a steady operating condition of the engine, it is necessary for the method of JP '647 to correct the fuel injection amount using the calculated deviation amount only within the steady operating condition in order to ensure sufficient correction accuracy.

SUMMARY OF THE INVENTION

The present invention was attained in view of the above-described characteristics of the related art. An aspect of the present invention is to provide a fuel supply control system for an internal combustion engine which appropriately monitors the operating characteristic of the fuel injection device in order to always accurately correct the fuel injection amount.

To attain the above-described aspect, the present invention provides a fuel supply control system for an internal combustion engine having fuel injection means that injects fuel into an intake pipe or a combustion chamber of the engine. The fuel supply control system includes intake air flow rate detecting means that detects a flow rate of air supplied to the engine, air-fuel ratio detecting means provided in an exhaust system of the engine, fuel injection amount setting means, command value calculating means, burned fuel amount estimating means, identifying means, and correcting means. The air-fuel ratio detecting means detects an air-fuel ratio of an air-fuel mixture in the combustion chamber. The fuel injection amount setting means sets a demand fuel injection amount (MFDMD) according to an operating condition of the engine. The command value calculating means calculates an injection amount command value (MFCMD) of fuel injected by the fuel injection means according to the demand fuel injection amount (MFDMD). The burned fuel amount estimating means estimates an amount (MFEST) of fuel burned in the engine according to the intake air flow rate (MA) detected by the intake air flow rate detecting means and the air-fuel ratio (AFR) detected by the air-fuel ratio detecting means. The identifying means identifies at least two correlation parameters (a, b) which indicate a relationship between the estimated burned fuel amount (MFEST) and the injection amount command value (MFCMD). The correcting means corrects the injection amount command value (MFCMD) according to the at least two correlation parameters (a, b) identified by the identifying means.

With the above-described structural configuration, the injection amount command value is calculated according to the demand fuel injection amount set according to the engine operating condition, and the amount of fuel burned in the engine is estimated according to the detected intake air flow rate and air-fuel ratio. The at least two correlation parameters indicative of the relationship between the estimated burned fuel amount and the injection amount command value are calculated, and a correction of the injection amount command value is performed according to the identified at least two correlation parameters. Since the relationship between the actual burned fuel amount and the injection amount command value is appropriately monitored using at least two correlation parameters, accurate correction of the fuel injection amount is performed regardless of the engine operating condition by using the at least two correlation parameters. Consequently, it is possible to prevent the engine output from deviating from the desired value and the exhaust characteristic of the engine from deteriorating due to differences in the manufacturing process or component aging in the injection characteristic of the fuel injection means.

Preferably, the identifying means identifies the at least two correlation parameters (a, b) using a sequential least square method algorithm.

With the above-described structural configuration, the at least two correlation parameters are identified using the sequential least square method algorithm. Accordingly, the identifying calculation is performed using a relatively small memory capacity.

Preferably, the fuel supply control system further includes deterioration determining means that determines that the fuel injection means has deteriorated when at least one of the correlation parameters (a, b) identified by the identifying means takes a value outside a predetermined set range.

With the above-described structural configuration, it is determined that the fuel injection means has deteriorated when at least one of the correlation parameters identified by the identifying means takes a value outside the predetermined set range. Therefore, deterioration of the fuel injection means is promptly determined.

DETAILED DESCRIPTION OF THE PREFERRED EMBODIMENTS

Preferred embodiments of the present invention are described below with reference to the attached drawings.

Figure 1:
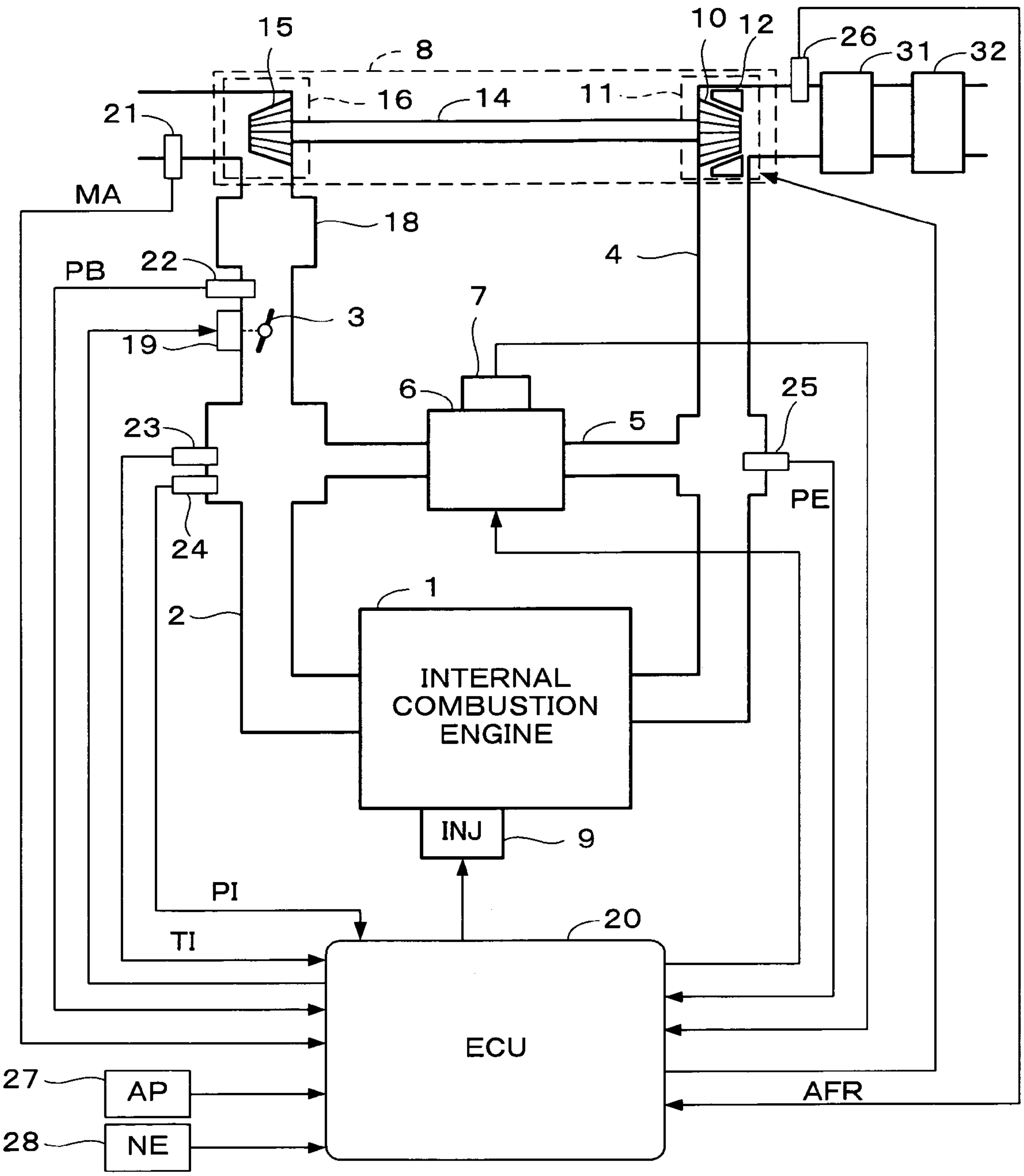
FIG. 1 is a schematic diagram of an internal combustion engine and a control system therefor according to an embodiment of the present invention.

FIG. 1 is a schematic diagram of an internal combustion engine and a control system therefor according to a first embodiment of the present invention. The internal combustion engine 1 (hereinafter referred to as "engine") is a diesel engine wherein fuel is injected directly into the cylinders. Each cylinder is provided with a fuel injection valve 9 that is electrically connected to an electronic control unit (hereinafter referred to as "ECU 20"). The ECU 20 controls a valve opening period of each fuel injection valve 9.

The engine 1 has an intake pipe 2, an exhaust pipe 4, and a turbocharger 8. The turbocharger 8 includes a turbine 11 and a compressor 16. The turbine 11 has a turbine wheel 10 rotationally driven by the kinetic energy of exhaust gases. The compressor 16 has a compressor wheel 15 connected to the turbine wheel 10 via a shaft 14. The compressor wheel 15 pressurizes (compresses) the intake air of the engine 1.

The turbine 11 has a plurality of movable vanes 12 (two are shown for illustrative purposes only) and an actuator (not shown) for actuating the movable vanes 12 to open and close. The plurality of movable vanes 12 are actuated to open and close in order to change a flow rate of exhaust gases injected to the turbine wheel 10. The turbine 11 is configured so that the flow rate of exhaust gases injected to the turbine wheel 10 is changed by varying an opening of the movable vane 12 (hereinafter referred to as "vane opening VO"), to change the rotational speed of the turbine wheel 10. The actuator, which actuates the movable vanes 12, is connected to the ECU 20 which controls the vane opening VO. Specifically, the ECU 20 supplies a control signal of a variable duty ratio to the actuator and therein controls the vane opening VO using the control signal.

The intake pipe 2 is provided with an intercooler 18 downstream of the compressor 16 and a throttle valve 3 downstream of the intercooler 18. The throttle valve 3 is configured to open and close by an actuator 19 connected to the ECU 20. The ECU 20 performs opening control of the throttle valve 3 through the actuator 19.

An exhaust gas recirculation passage 5 that recirculates exhaust gases to the intake pipe 2 is provided between the exhaust pipe 4 and the intake pipe 2. The exhaust gas recirculation passage 5 is provided with an exhaust gas recirculation control valve 6 (hereinafter referred to as "EGR valve") that controls the amount of recirculated exhaust gases. The EGR valve 6 is an electromagnetic valve having a solenoid. A valve opening of the EGR valve 6 is controlled by the ECU 20. The EGR valve 6 is provided with a lift sensor 7 for detecting a valve opening LACT (a valve lift amount), and the detected signal is supplied to the ECU 20. The exhaust gas recirculation passage 5 and the EGR valve 6 define an exhaust gas recirculation mechanism.

An intake air flow rate sensor 21, a boost pressure sensor 22, an intake air temperature sensor 23, and an intake pressure sensor 24 are disposed in the intake pipe 2. The intake air flow rate sensor 21 detects an intake air flow rate MA. The boost pressure sensor 22 detects an intake pressure PB (boost pressure) at a portion of the intake pipe 2 downstream of the compressor 16. The intake air temperature sensor 23 detects an intake air temperature TI. The intake air pressure sensor 24 detects an intake pressure PI in the intake pipe 2. Further, an exhaust pressure sensor 25 and an air-fuel ratio sensor 26 are disposed in the exhaust pipe 4. The exhaust pressure sensor 25 detects an exhaust pressure PE at a portion of the exhaust pipe 4 upstream of the turbine 11. The air-fuel ratio sensor 26 detects an air-fuel ratio of an air-fuel mixture burning in the combustion chamber of the engine 1 according to a concentration of oxygen in the exhaust gases. The sensors 21 to 26 are connected to the ECU 20, and the detection signals from sensors 21 to 26 are supplied to the ECU 20.

A catalytic converter 31 and a particulate filter 32 are disposed downstream of the turbine 11 in the exhaust pipe 4. The catalytic converter 31 accelerates oxidation of hydrocarbon and CO in the exhaust gases. The particulate filter 32 traps particulate matter, which mainly consists of soot.

An accelerator sensor 27 and an engine rotational speed sensor 28 are connected to the ECU 20. The accelerator sensor 27 detects an operation amount AP of the accelerator (not shown) of the vehicle driven by the engine 1 (hereinafter referred to as "the accelerator pedal operation amount AP"). The engine rotational speed sensor 28 detects an engine rotational speed NE. The detection signals of the sensors 27 and 28 are also supplied to the ECU 20.

The ECU 20 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, and the like, performed by the CPU. The output circuit supplies control signals to the actuator for actuating the movable vanes 12 of the turbine 11, the fuel injection valves 9, the EGR valve 6, the actuator 19 for actuating the throttle valve 3, and the like.

The ECU 20 calculates a demand fuel injection amount MFDMD which is an amount of fuel to be injected by the fuel injection valve 9 according to the engine rotational speed NE and the accelerator operation amount AP, and further calculates a fuel injection amount command value MFCMD according to the demand fuel injection amount MFDMD. In order to perform fuel injection, the ECU 20 supplies drive signals in accordance with the fuel injection amount command value MFCMD to fuel injection valves 9.

Figure 2:
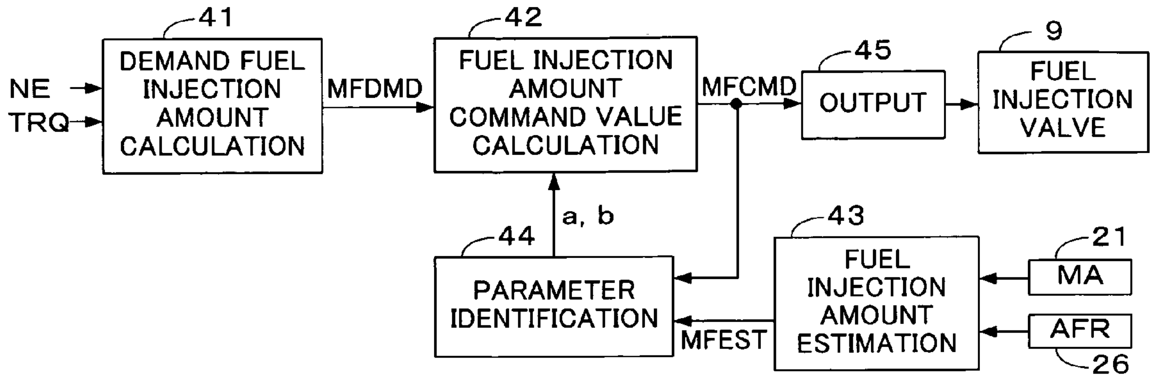
FIG. 2 is a block diagram of a fuel supply control module.

FIG. 2 is a block diagram of a module which performs control of fuel injection. The function of each block of the module is actually realized by the operation process of the CPU in the ECU 20.

The fuel injection control module shown in FIG. 2 includes a demand fuel injection amount calculation block 41, a fuel injection amount command value calculation block 42, a fuel injection amount estimation block 43, a parameter identification block 44, and an output block 45.

The demand fuel injection amount calculation block 41 calculates the demand fuel injection amount MFDMD according to the engine rotational speed NE and a demand torque TRQ. The demand torque TRQ is set to be increased as the accelerator operation amount AP increases. The fuel injection amount command value calculation block 42 calculates the fuel injection amount command value MFCMD according to the demand fuel injection amount MFDMD and correlation parameters "a" and "b" supplied from the parameter identification block 44.

The fuel injection amount estimation block 43 applies the detected intake air flow rate MA and air fuel ratio AFR to equation (1) to calculate an estimated value MFEST of an amount of fuel that is actually burned (hereinafter referred to as "estimated burned fuel amount MFEST".

$$MFEST=MA/AFR \quad (1)$$

The parameter identification block 44 identifies the correlation parameters "a" and "b" that indicate a relationship between the fuel injection amount command value MFCMD and the estimated burned fuel amount MFEST according to the fuel injection amount command value MFCMD and the estimated burned fuel amount MFEST.

The output block 45 generates a drive signal of the fuel injection valve 9 according to the fuel injection amount command value MFCMD and supplies the drive signal to the fuel injection valve 9.

Figure 3:
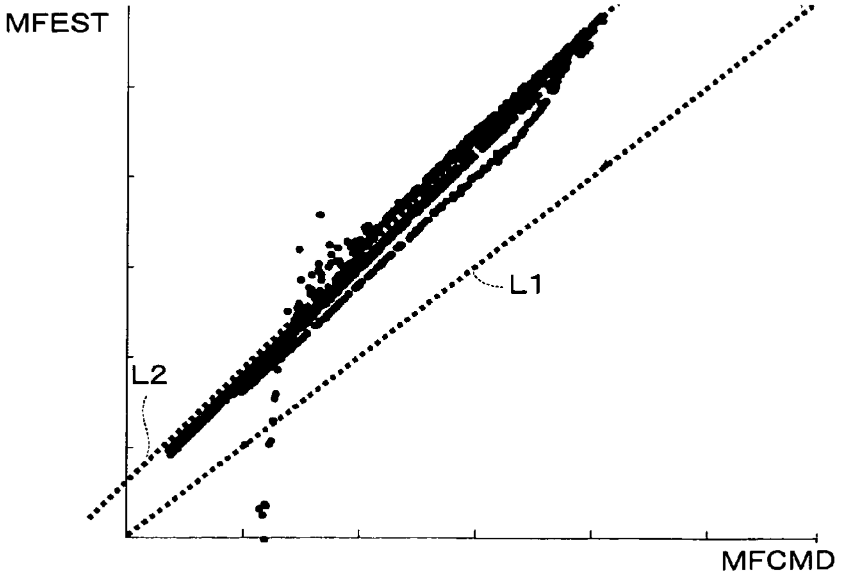
FIG. 3 is a graph showing a relationship between the fuel injection amount command value (MFCMD) and the estimated burned fuel amount (MFEST)

FIG. 3 shows a relationship between the fuel injection amount command value MFCMD and the estimated burned fuel amount MFEST. The line L1 shown in FIG. 3 indicates an ideal relationship wherein the estimated burned fuel amount MFEST is equal to the fuel injection amount command value MFCMD. The plurality of dots shown in FIG. 3 show actually-measured data, and the line L2 is a regression line calculated by applying the least square method to the measured data. That is, the line L2 is expressed with equation (2) using the correlation parameters "a" and "b".

$$MFEST=a\times MFCMD+b \quad (2)$$

In this embodiment, the parameter identification block 44 identifies the correlation parameters "a" and "b" by the sequential identification algorithm using recursive equations. Specifically, the sequential identification algorithm is an algorithm which calculates present values a(k) and b(k) of the correlation parameters based on present values (the newest values) MFCMD(k) and MFEST(k) of the time series data to be processed and the preceding values a(k−1) and b(k−1) of the correlation parameters.

If a correlation parameter vector θ(k) including the correlation parameters "a" and "b" as elements is defined by equation (3), the correlation parameter vector θ(k) is calculated by equation (4) according to the sequential identification algorithm.

$$\theta(k)^T=[a(k)\ b(k)] \quad (3)$$

$$\theta(k)=\theta(k-1)+KP(k)\times eid(k) \quad (4)$$

In the equation (4), eid(k) is an identification error defined by equations (5) and (6). Further, KP(k) is a gain coefficient vector defined by equation (7), and P(k) in equation (7) is a second order square matrix calculated by equation (8).

$$eid(k)=MFEST(k)-\theta(k-1)^T\zeta(k) \quad (5)$$

$$\zeta^T(k)=[\,MFCMD(k-1)\quad 1\,] \quad (6)$$

$$KP(k)=\frac{P(k)\zeta(k)}{1+\zeta^T(k)P(k)\zeta(k)} \quad (7)$$

-continued $$P(k+1)=\frac{1}{\lambda_1}\left(I-\frac{\lambda_2 P(k)\zeta(k)\zeta^T(k)}{\lambda_1+\lambda_2\zeta^T(k)P(k)\zeta(k)}\right)P(k) \quad (8)$$

(I: unit matrix)

In accordance with the setting of coefficients λ1 and λ2 in equation (8), the identification algorithm of equations (4)-(8) becomes one of the following four identification algorithms:

λ1=1, λ2=0 Fixed gain algorithm

λ1=1, λ2=1 Least square method algorithm

λ1=1, λ2=λ Degressive gain algorithm (λ is a given value other than 0, 1)

λ1=λ, λ2=1 Weighted least square method algorithm (λ is a given value other than 0, 1)

In this embodiment, the weighted least square method algorithm may be employed by setting the coefficient λ1 to a predetermined value λ falling between "0" and "1", and setting the coefficient λ2 to "1". Any one of the other algorithms may be adopted. Among these algorithms, the least square method algorithm and the weighted least square method algorithm are suitable for the statistical processing.

According to the sequential identification algorithm of equations (4) to (8), the inverse matrix computation is not required. However, the inverse matrix computation is required for the batch operation type least square method mentioned above. The values to be stored in the memory are only a(k), b(k), and P(k) (2×2 matrix). Accordingly, by using the sequential weighted least square method, the statistical processing operation is simplified and performed by the engine control CPU without using any special CPU for the statistical processing operation.

Figure 4:
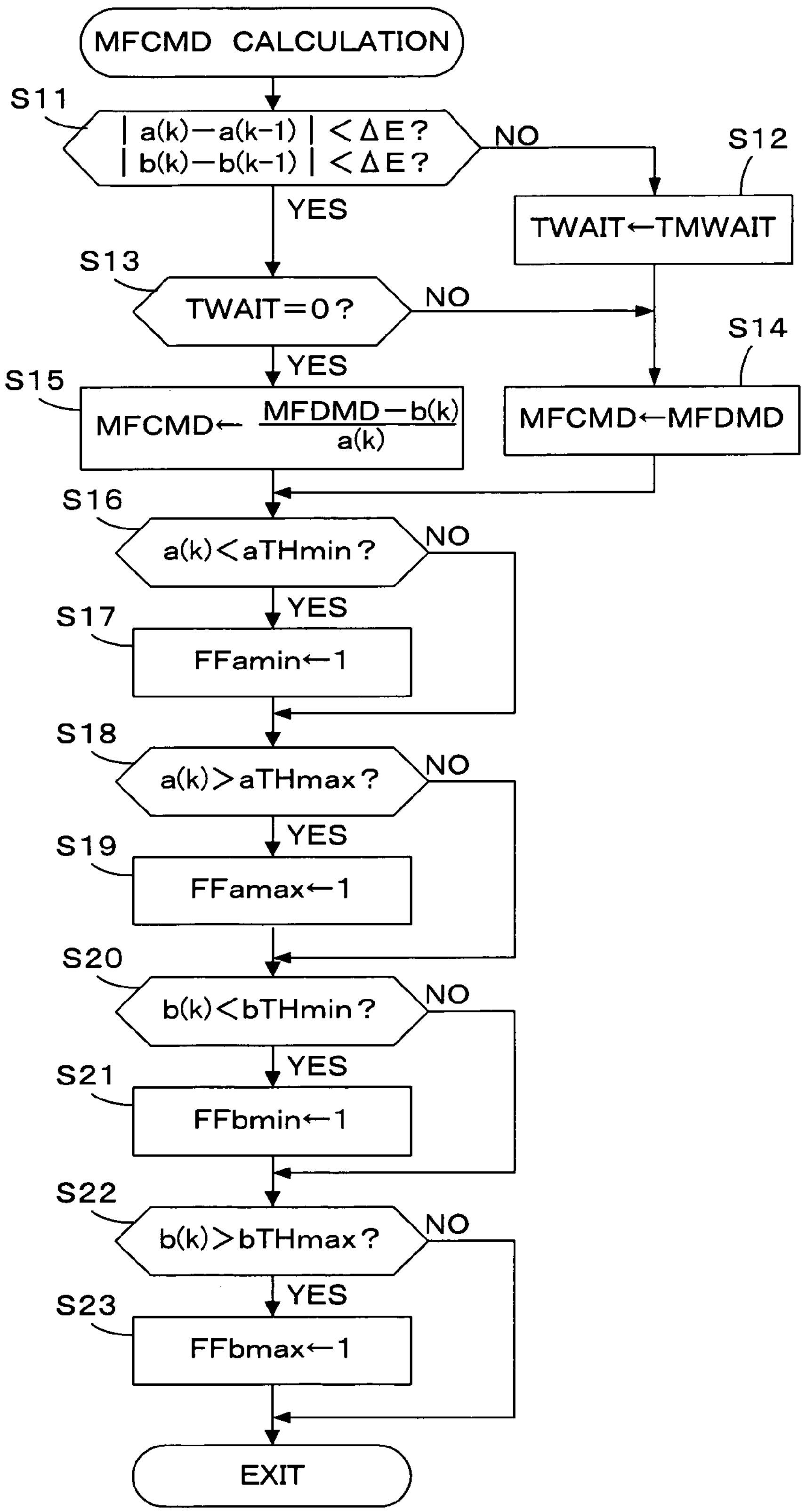
FIG. 4 is a flowchart of a process in a fuel injection amount command value calculation block of FIG. 2.

FIG. 4 is a flowchart of the operation process in the fuel injection amount command value calculation block 42. The operation process is executed by the CPU in the ECU 20 in synchronicity with generation of the TDC pulse.

In step S11, it is determined whether both of the absolute values of differences between the present values and the preceding values of the correlation parameters "a" and "b" are less than a predetermined value ΔE (for example, 0.05). If the answer to step S11 is a negative (NO), i.e., values of the correlation parameters "a" and "b" have not converged, and a down count timer TWAIT is set to a predetermined time period TMWAIT (for example, 10 seconds) and started (step S12). Further, the fuel injection amount command value MFCMD is set to the demand fuel injection amount MFDMD (step S14).

If the answer to step S11 is affirmative (YES), it is determined whether the value of the timer TWAIT started in step S12 is "0" (step S13). Since the answer to step S11 is at first negative (NO), the process proceeds to step S14 described above. If TWAIT becomes "0", the process proceeds from step S13 to step S15, wherein the identified correlation parameters a(k) and b(k) and the demand fuel injection amount MFDMD are applied to equation (9) to calculate the fuel injection amount command value MFCMD.

$$MFCMD=(MFDMD-b(k))/a(k) \quad (9)$$

In steps S16-S23, a deterioration determination is performed based on the correlation parameters a(k) and b(k). That is, in step S16, it is determined whether the correlation parameter a(k) is less than a first determination threshold value aTHmin (for example, 0.85). If the answer to step S16 is affirmative (YES), a deterioration in which the injection amount decreases, due to blockage of the nozzle of the fuel injection valve 9, is determined to be present, and a first deterioration determination flag FFamin is set to "1" (step S17). If the answer to step S16 is negative (NO), the process immediately proceeds to step S18.

In step S18, it is determined whether the correlation parameter a(k) is greater than a second determination threshold value aTHmax (for example, 1.2). If the answer to step S18 is affirmative (YES), a deterioration in which the injection amount increases due to abrasion of the nozzle of the fuel injection valve 9 is determined to be present, and a second deterioration determination flag FFamax is set to "1" (step S19). If the answer to step S18 is negative (NO), the process immediately proceeds to step S20.

In step S20, it is determined whether the correlation parameter b(k) is less than a third determination threshold value bTHmin (for example, −0.1). If the answer to step S20 is affirmative (YES), such a determination indicates that a region where fuel is not supplied is present when supplying a drive signal for gradually opening the fuel injection valve 9 from the fully-closed state. Therefore, blocking of the nozzle of the fuel injection valve 9 is determined to be present, and a third deterioration determination flag FFbmin is set to "1" (step S21). If the answer to step S20 is negative (NO), the process immediately proceeds to step S22.

In step S22, it is determined whether the correlation parameter b(k) is greater than a fourth determination threshold value bTHmax (for example, 0.1). If the answer to step S22 is affirmative (YES), such a determination indicates that fuel is supplied even when a drive signal for fully closing the fuel injection valve 9 is determined to be present. Accordingly, a fuel leak is determined to be present, and a fourth deterioration determination flag FFbmax is set to "1" (step S23). If the answer to step S22 is negative (NO), the process immediately ends.

Figure 5A:
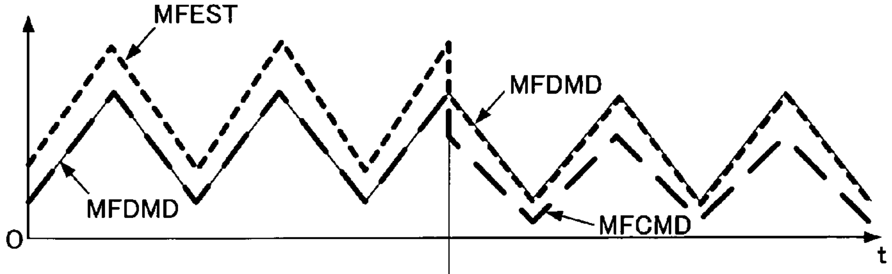
FIGS. 5A and 5B are time charts indicating changes in the demand fuel injection amount (MFDMD), the fuel injection amount command value (MFCMD), the estimated burned fuel amount (MFEST), and the correlation parameters (a, b).
Figure 5B:
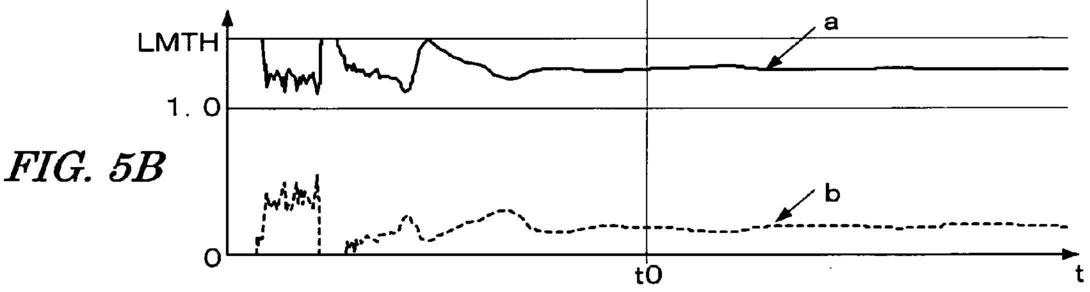

FIGS. 5A and 5B are time charts showing changes in the fuel injection amount command value MFCMD and the estimated burned fuel amount MFEST when changing the demand fuel injection amount MFDMD in the saw tooth waveform. FIGS. 5A and 5B show an example wherein the value of the timer TWAIT becomes "0" at time t0 and the correction by the correlation parameters "a" and "b" is started at time t0.

The thin solid line of FIG. 5A shows changes in the demand fuel injection amount MFDMD, and the thick dashed lines show changes in the fuel injection amount command value MFCMD and the estimated burned fuel amount MFEST, respectively. LMTH in FIG. 5B indicates the maximum value of the correlation parameter "a".

At the beginning of the identifying calculation, the correlation parameters "a" and "b" are not in a stabilized state and greatly vary or change. However, the correlation parameters "a" and "b" gradually converge as the number of data samples increases. At time t0, the value of the timer TWAIT becomes "0" and calculation of the fuel injection amount command value MFCMD using equation (9) is started. Before time t0, the fuel injection amount command value MFCMD is equal to the demand fuel injection amount MFDMD, and the estimated burned fuel amount MFEST deviates in the increasing direction from the demand fuel injection amount MFDMD. After time t0, the fuel injection amount command value MFCMD, as a result of the correction, becomes less than the demand fuel injection amount MFDMD. On the other hand, the estimated burned fuel amount MFEST coincides with the demand fuel injection amount MFDMD, indicating that the required amount of fuel is correctly injected.

As described above, in this embodiment, the relationship between the fuel injection amount command value MFCMD and the estimated burned fuel amount MFEST is approximated in a straight line, the two correlation parameters "a" and "b" are identified, and the fuel injection amount command value MFCMD is calculated using the identified correlation parameters "a" and "b". Accordingly, an accurate amount of fuel injection is performed regardless of any differences due to the manufacturing process or component aging in the injection characteristic of the fuel injection valve 9.

Further, a deterioration determination of the fuel injection valve 9 is performed based on the values of the correlation parameters "a" and "b" in steps S16-S23 of FIG. 4. Accordingly, deterioration of the fuel injection valve 9 is promptly determined.

In this embodiment, the fuel injection valve 9, the intake air flow rate sensor 21, and the air-fuel ratio sensor 26 correspond, respectively, to the fuel injection means, the intake air flow rate detecting means, and the air-fuel ratio detecting means. The ECU 20 forms the fuel injection amount setting means, the command value calculating means, the burned fuel amount estimating means, the identifying means, the correcting means, and the deterioration determining means. Specifically, the demand fuel injection amount calculation block 41 corresponds to the fuel injection amount setting means, and the fuel injection amount command value calculation block 42 corresponds to the command value calculating means, the correcting means, and the deterioration determining means. Further, the fuel injection amount estimating block 43 corresponds to the burned fuel amount estimating means, and the parameter identification block 44 corresponds to the identifying means.

The present invention is not limited to the embodiment described above, but various modifications may be made thereto. For example, in the above-described embodiment, the relationship between the fuel injection amount command value MFCMD and the estimated burned fuel amount MFEST is approximated in a straight line (linear function), and the two correlation parameters "a" and "b" are identified. Alternatively, the relationship between the fuel injection amount command value MFCMD and the estimated burned fuel amount MFEST may be approximated by a quadratic function or a higher order function, and three or more correlation parameters may be identified.

Further, the intake air flow rate of the engine 1 may be calculated according to the engine rotational speed NE and the intake pressure PI. In such a case, the intake pressure sensor 24, the engine rotational speed sensor 28, and the ECU 20 form the intake air flow rate detecting system.

In the above-described embodiment, an example where the present invention is applied to a fuel supply control of a diesel internal combustion engine is described. The present invention is also applicable to a fuel supply control of a direct injection gasoline internal combustion engine in which fuel is directly injected into the combustion chamber, or a gasoline internal combustion engine in which fuel is injected into the intake pipe.

The present invention also can be applied to a control of a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all modifications which come within the meaning and range of equivalency of the claims are, therefore, to be embraced therein.

What is claimed is:

1. A fuel supply control system for an internal combustion engine having fuel injection means for injecting fuel into an intake pipe or a combustion chamber of said engine, said fuel supply control system comprising:

intake air flow rate detecting means for detecting a flow rate of air supplied to said engine;

air-fuel ratio detecting means provided in an exhaust system of said engine for detecting an air-fuel ratio of an air-fuel mixture in said combustion chamber;

fuel injection amount setting means for setting a demand fuel injection amount according to an operating condition of said engine;

command value calculating means for calculating an injection amount command value of fuel injected by said fuel injection means according to the demand fuel injection amount;

burned fuel amount estimating means for estimating an amount of fuel burned in said engine according to the detected intake air flow rate and the detected air-fuel ratio;

identifying means for identifying at least two correlation parameters indicating a relationship between the estimated burned fuel amount and the injection amount command value; and correcting means for correcting the injection amount command value according to the at least two correlation parameters identified by said identifying means.

2. The fuel supply control system according to claim 1, wherein said identifying means identifies the at least two correlation parameters using a sequential least square method algorithm.

3. The fuel supply control system according to claims 1, further comprising deterioration determining means for determining said fuel injection means has deteriorated when at least one of the correlation parameters identified by said identifying means takes a value outside a predetermined set range.

4. A fuel supply control method for an internal combustion engine having at least one fuel injection valve for injecting fuel into an intake pipe or a combustion chamber of said engine, said fuel supply control method comprising the steps of:

a) detecting a flow rate of air supplied to said engine;

b) detecting an air-fuel ratio of an air-fuel mixture in said combustion chamber by an air-fuel ratio sensor provided in an exhaust system of said engine;

c) setting a demand fuel injection amount according to an operating condition of said engine;

d) calculating an injection amount command value of fuel injected by said at least one fuel injection valve according to the demand fuel injection amount;

e) estimating an amount of fuel burned in said engine according to the detected intake air flow rate and the detected air-fuel ratio;

f) identifying at least two correlation parameters which indicate a relationship between the estimated burned fuel amount and the injection amount command value; and g) correcting the injection amount command value according to the at least two identified correlation parameters.

5. The fuel supply control method according to claim 4, wherein the at least two correlation parameters are identified using a sequential least square method algorithm.

6. The fuel supply control method according to claim 4, further comprising the step of determining that said at least one fuel injection valve has deteriorated when at least one of the identified correlation parameters takes a value outside a predetermined set range.

* * * * *